(12) United States Patent
Schuplin et al.

(10) Patent No.: US 6,363,310 B1
(45) Date of Patent: Mar. 26, 2002

(54) APPARATUS AND METHOD FOR VEHICLE SPEED CONTROL

(75) Inventors: Michael G. Schuplin, Davison; Timothy L. Guest, Flint; Diana K. Voges, Fenton; Lisa Marie Unuvar, Flint, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/533,096

(22) Filed: Mar. 23, 2000

(51) Int. Cl.⁷ .................. G05D 1/00; G05D 13/00; G06G 7/00; G06G 17/00; G06G 19/00

(52) U.S. Cl. .................. 701/93; 701/94; 701/95; 123/319; 123/349; 123/350; 123/352; 123/400; 123/402; 74/502.4; 180/170; 180/177

(58) Field of Search .................. 701/93–95, 110, 701/102; 123/400, 402, 319, 349, 350, 352; 74/502.4; 180/170, 177

(56) References Cited

U.S. PATENT DOCUMENTS

| | | | | |
|---|---|---|---|---|
| 4,493,303 A | * | 1/1985 | Thompson et al. | 123/357 |
| 5,575,180 A | * | 11/1996 | Simon | 74/502.4 |
| 5,625,558 A | * | 4/1997 | Togai et al. | 364/426.041 |
| 5,835,877 A | * | 11/1998 | Unuvar et al. | 701/93 |

\* cited by examiner

Primary Examiner—William A. Cuchlinski, Jr.
Assistant Examiner—Ronnie Mancho
(74) Attorney, Agent, or Firm—Vincent A. Cichosz

(57) ABSTRACT

An apparatus and method for controlling the speed of a vehicle, the apparatus manipulates a cable having one end secured to a throttle and the other secured to a motor for applying a force to the cable. A motor controller provides commands to the motor and the motor controller receives an input in the form of a vehicle velocity setting and in response to the value of the setting setting the motor controller instructs the motor to pull the cable a predetermined distance corresponding to a predetermined throttle position, the predetermined distance is stored in a lookup table and the predetermined throttle position corresponds to a vehicle velocity that is similar to the vehicle velocity setting. If the vehicle does not obtain the vehicle velocity setting the control authorizes the motor to pull the cable further, once the vehicle reaches the vehicle velocity setting the controller determines the current throttle position and determines if the current throttle position is greater than the predetermined throttle position if so, the controller modifies the predetermined throttle position corresponding to the vehicle velocity setting.

16 Claims, 3 Drawing Sheets

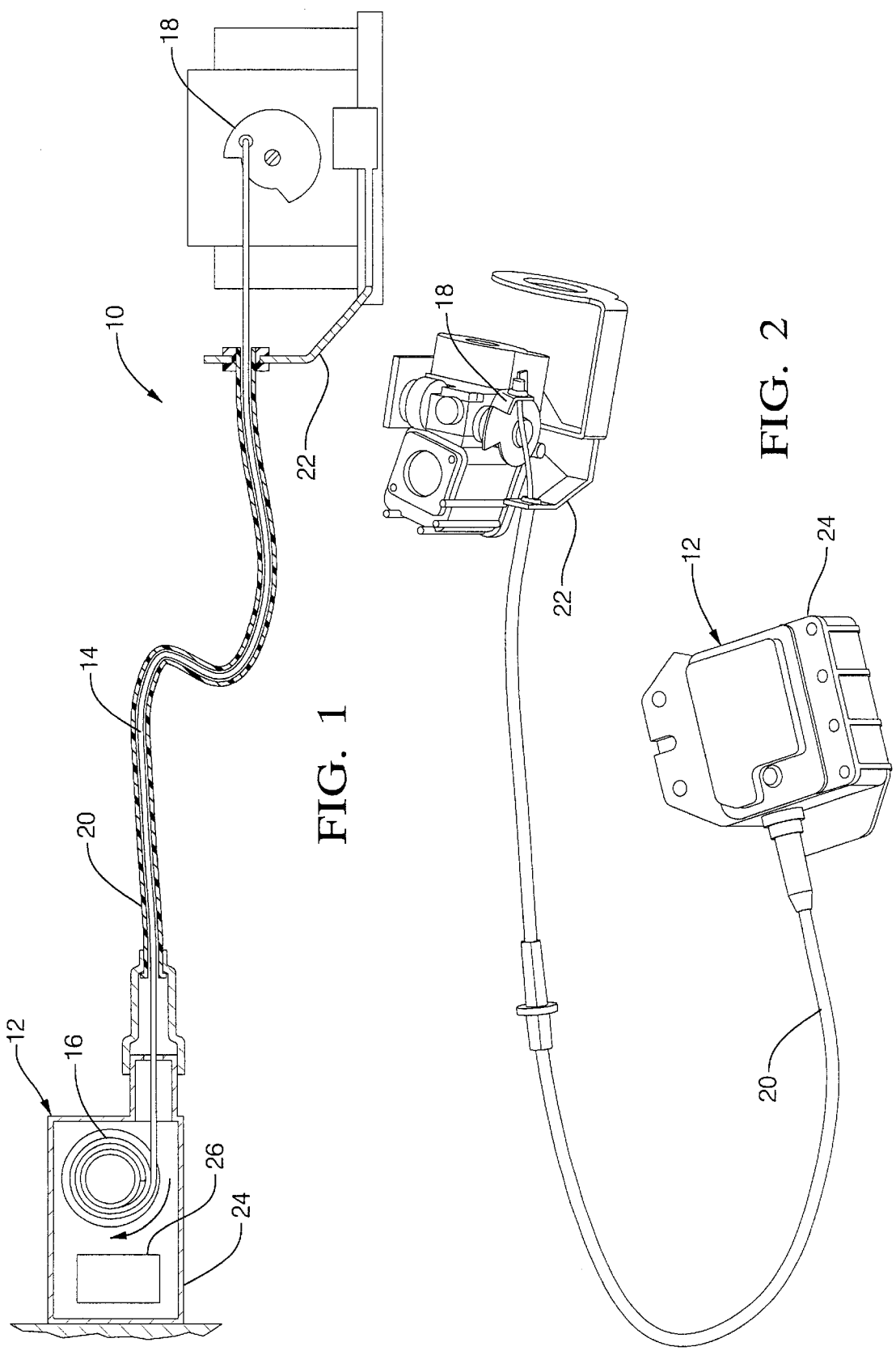

| LOCKUP OFFSET TABLE ( U_K_LOCKUP_TABLE ) | | | |
|---|---|---|---|
| LOCKUP OFFSET ( ROAD LOAD THROTTLE ) IS INTERPOLATED FROM THE RAM TABLE BASED ON VEHICLE SPEED. THE FOLLOWING TABLE CONTAINS THE PREDEFINED ROM VALUES. | | | |
| TABLE OFFSET | VEHICLE SPEED ( MPH ) | ROM TABLE (KV_LOCKUP_TABLE) | UNITS |
| 0 | 24 | 20 | MOTOR STEPS |
| 1 | 40 | 30 | MOTOR STEPS |
| 2 | 56 | 40 | MOTOR STEPS |
| 3 | 72 | 50 | MOTOR STEPS |
| 4 | 88 | 60 | MOTOR STEPS |
| 5 | 104 | 70 | MOTOR STEPS |

APPARATUS AND METHOD FOR VEHICLE SPEED CONTROL

This application is related to U.S. Pat. No. 5,680,024 the contents of which are incorporated herein by reference thereto.

TECHNICAL FIELD

The present invention relates to vehicles. In particular, an apparatus for determining and providing a cable lash compensation for a cruise control cable is disclosed.

BACKGROUND OF THE INVENTION

Once initialized, a cruise control system maintains a selected vehicle speed until the system is disabled or its setting is changed. The cruise control system employs a cable that is secured to a throttle cam of a throttle assembly at one end and a mechanism for applying a force to the cable at the other end. Once the cruise control system of a vehicle has been set for a given speed the mechanism receives a command or plurality of commands to either pull the cable and increase the engine RPMs or maintain the cable's current position or allow the biasing spring of the throttle cam to decrease the engine RPMs.

In order to prevent a cruise control system from having an unnecessary delay in executing the commands of the cruise control system it is desirable to anticipate the required throttle position based upon a given vehicle speed setting. This is particularly desirable in applications when the cruise control system is first initialized.

However, driving conditions are constantly changing and an initial setting of a cruise control system for a given vehicle speed rarely has the identical throttle position. For example, and if a vehicle is traveling up a hill, the system will require a greater throttle position than the same vehicle traveling on a level road or lower incline. In addition, the same is true for a vehicle traveling down an incline as opposed to a level road. Moreover, the vehicles loads may also vary due to the number of passengers and whether the vehicle is towing an object such as a boat or trailer.

Accordingly, there is a need for a cruise control system wherein the system can anticipate variations in the system and respond to them accordingly.

SUMMARY OF THE INVENTION

In an exemplary embodiment, the control algorithm of a cruise control module is modified to include a lash learn process wherein the designed absolute value of how much cable is allowed is adjusted for lash that is encountered by the system.

In another embodiment, the lash learn process or algorithm sets a limit for the maximum lash that can be learned and the maximum lash that can be changed for each adjustment.

The above-described and other features and advantages of the present invention will be appreciated and understood by those skilled in the art from the following detailed description, drawings, and appended claims.

BRIEF DESCRIPTION OF THE DRAWINGS

FIG. 1 is a diagrammatic view of a cruise control system employing the cruise control module of the instant application;

FIG. 2 is a perspective view of a cruise control system with a cable adjuster;

DESCRIPTION OF THE PREFERRED EMBODIMENT

Figure 3:
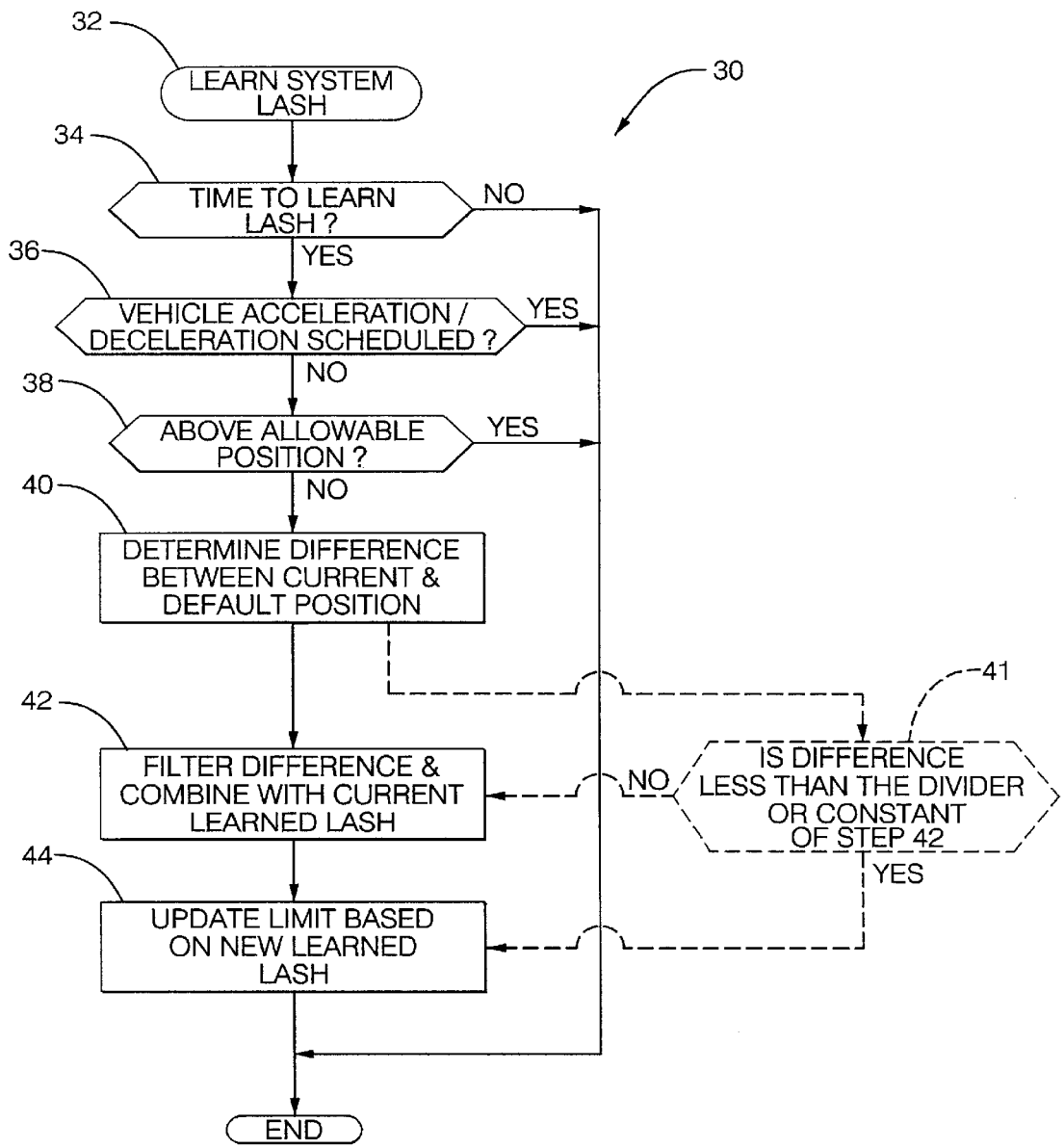
FIG. 3 is a flowchart illustrating portions of the command sequence of a control algorithm employing the learn as system of the instant application.

Referring now to FIG. 1, a cruise control cable system 10 constructed in accordance with the present invention is illustrated. System 10 includes a cruise control module (CCM) 12 and a cruise control cable 14. Cruise control cable 14 is secured to a stepper motor 16 at one end and a throttle cam 18 at the other. A cable liner 20 encases cable 14 and is secured to cruise control module 12 at one end and a reaction bracket 22 at the other. As an alternative, stepper motor 16 can be replaced by an actuating device that is capable of being calibrated and is secured to cruise control cable 14 or a flexible connector securing one end of cable 14 to the mechanical actuating device.

The throttle cable liner has a first end adapted for connection to the cruise control module (CCM) and a second end which is adapted to attach the reaction bracket that serves to keep the cable liner or sheath stationary with respect to the engine that the throttle controls. The bracket is preferably mounted on the engine itself. The cable has a control module end fitting for attachment to the CCM or directly to the stepper motor. The cable also has a throttle end fitting that is adapted to attach to the throttle cam such that back and forth motion of the cable through the cable liner causes the engine throttle to open and close.

As is typical with core wire-and-sheath cables, there will usually be lash in cable 14. The typical solution is to provide a lash adjuster that allows the manufacturer to tighten out the lash in the core wire at the factory. The problem is that, manual change of the lash adjuster is required during assembly of the vehicle. Adjusters are sometimes located in places where they are difficult to reach. Also, during the assembly process it is possible to miss making the adjustment or not lock down the adjuster, thus leaving a lash error up to as much as 20 mm.

This present invention does away with the requirement of a lash adjuster altogether and instead makes calibrated adjustments to the CCM and eliminating the effects of lash.

It is noted that cruise control system 10 does not utilize a cable adjuster (FIG. 2) that is installed on cable liner 20 and is used to take the slack out of cable 14 after it has been attached to the cruise control module and the throttle cam. Moreover, and since no cable adjuster is installed, this allows for a cost reduction in labor and manufacturing since the installation and adjustment of the cable would not be required on the vehicle assembly line.

In addition, and due to the physical limitations (i.e. confined space) of vehicle engine compartments, the installation and adjustment of a cruise control cable is labor-intensive in view of the time allotments on an assembly line.

Cruise control module 12 includes a housing 24 into which certain components of cruise control system 10 are secured, such components include but are not limited to the following, a stepper motor 16, a microcontroller 26, a EEPROM (not shown) and a circuit board (not shown).

A computer algorithm is employed and microcontroller 26 sends control signals to stepper motor 16. The algorithm is designed in such a way that for a particular vehicle it is known where the throttle needs to be located for a given speed. This is derived experimentally by driving a vehicle on level road, with no lash in the system, no wind and at a known temperature. The vehicle travels at various known speeds and the number of "motor steps" of the stepper motor for attaining the various known speeds is recorded. These values are then entered into a lookup table, which is stored in the non-volatile memory of the cruise control module.

If lash (or slack in the cable) occurs in the system the cruise control system will pull the same throttle point for a given speed however and due to the lash in the cable the cruise control will need more authority to pull the cable further to actually reach the desired speed. The final position of the throttle and the cable are recorded by the number of motor steps required for that position.

The difference between the motor steps as calibrated and the motor steps as driven equates to the cable lash in the system. The difference in motor steps is then added to the total allowed motor steps of the system and the lookup table is modified to add the number of steps to each lookup value thus eliminating the drop that occurs on setting the cruise with the lash in the system.

In an exemplary embodiment, the control algorithm of the cruise control module employs a lash learn process wherein additional motor steps are supplemented to the data stored in the lookup table of the microprocessor of the cruise control module.

Accordingly, and with this known information each time the cruise control system of a vehicle is activated and the setting of a known speed value is entered into the cruise control system the corresponding value relating to the number of motor steps is accessed. However, and in situations and/or applications due to vehicle loads and or road conditions where there is lash in the system (i.e. additional cable movement required for the entered speed) a lash learn program or portion of a control algorithm is run to record the lash required.

A typical CCM is diagrammatically represented in FIG. 1. The CCM takes as inputs (a) the set command, (b) the current velocity of the vehicle, and the CCM determines (c) the correct throttle position required for the set speed. The CCM of this invention has a lookup table or equivalent (FIG. 5) function in non-volatile memory where it stores the number of steps of the stepper motor position as a function of vehicle velocity. This table has default values written to it at the factory. The purpose of the table is that when the driver demands a particular cruise control speed, the CCM goes to the table to find the appropriate number of motor steps required for that speed and then sets the throttle accordingly. Throttle adjustment is performed by the feedback portion of the cruise algorithm. This forces movement of the inner cable 14 that is directly attached to the cruise control module and the throttle cam. The procedures of this invention, which are preferably executed as software, correct for this problem by first learning the extent of the lash and then correcting for it.

Referring now to FIG. 3, a flow chart 30 illustrates the lash-learning procedure of the invention. Preferably, the procedure will be executed at regular time intervals, perhaps 30 seconds to 1 minute. Flowchart 30 illustrates portions of the control algorithm employed by the microcontroller of cruise control module 12. A first step 32 initializes the lash learn portion of the control algorithm. A decision node 34 determines whether or not it is time to learn lash. In an exemplary embodiment, the learn lash program is run every 30 seconds. Therefore, and through the use of a clock and or timer decision node 34 determines whether 30 seconds has expired since the last time lash was learned. Of course, and as applications may require, this time interval may vary.

If decision node 34 has determined that is time to learn lash a decision noted 36 determines whether a vehicle acceleration or deceleration is scheduled. This is determined by the current cruise setting and the current vehicle speed if the two are the same then it is determined that no vehicle acceleration and or deceleration is scheduled and the process moves on to decision node 38.

Decision node 38 determines whether the system is above a calibrated maximum allowable number of motor steps or actuator position stored in the lookup table. These values corresponding to various vehicle speeds are initially derived experimentally and are supplemented through the use of the computer algorithm. These values are entered into a lookup table, which is stored in the non-volatile memory in the cruise control module. In an exemplary embodiment, the number of steps of stepper motor 16 corresponding to resulting movement of the throttle cam are stored into a lookup table which is accessed by the computer algorithm of the instant application. Accordingly, and if the motor and cable position are not currently above the maximum allowable or default position defined in the lookup table a step 40 is initialized.

Step 40 determines the difference in steps of the stepper motor between the current position and the default position. Here, the actual position is read in and compared to the default position in the lookup table. Accordingly, step 40 produces a value (i.e. number of steps), which is inputted into a step 42. If the actual motor steps are equal to the calibrated motor steps then the lash is considered to be zero and is not updated.

Step 42 provides a filtering function to the difference determined by step 40. The filtering function reduces the value, if necessary, of the output of step 40. This is done so as to prevent an operator perceived increase in power. By "filtered" it is meant that the difference in position (step 40) is reduced to a smaller value, or "step" by step 42 which will be used by the algorithm to update the default position. This is accomplished by dividing the difference by some number and using the resultant as the "step".

It has been determined that the adjustments should be made gradually in smaller steps. This is because as we add steps the throttle moves causing a perceived bump in power. It is found that breaking the difference down into about five to about ten steps, preferably about eight steps yields good performance. Of course, and as applications may vary, the number of steps may also vary. Hence, for example, the computer algorithm divides the difference by eight, and then adds the one-eighth correction to a "learned lash" value that is stored in the on board non-volatile memory.

As an alternative, and as illustrated by the dashed lines in FIG. 3, and in order to prevent the filtering function of step 42 from reducing smaller step values a decision node 41 is inserted in between steps 40 and 42. Decision node 41 determines whether the difference is less than the divider of a step 42 or alternatively a constant may be employed. If the value is less than the divider or the constant value, decision node 41 will bypass the filtering step of step 42. If not, filtering step 42 is employed.

Next a step 44 calculates a new limit. Once the new limit is calculated the value is stored in the non-volatile memory. The "new limit" is now the maximum position allowed. The "new limit" is both a function of the learned lash and the calibrated absolute authority. For example, if the cruise control module has the authority of 40 mm of linear travel of the cable connected to the throttle cam and the system has 5 mm of lash, the resultant authority is 35 mm. With the lash learn system, if the system has learned 5 mm of lash then the mechanical portion still has 35 mm of travel to the throttle but the 5 mm of lash is added to the total value thus assuring the absolute value of 40 mm.

Figures 4, 5:
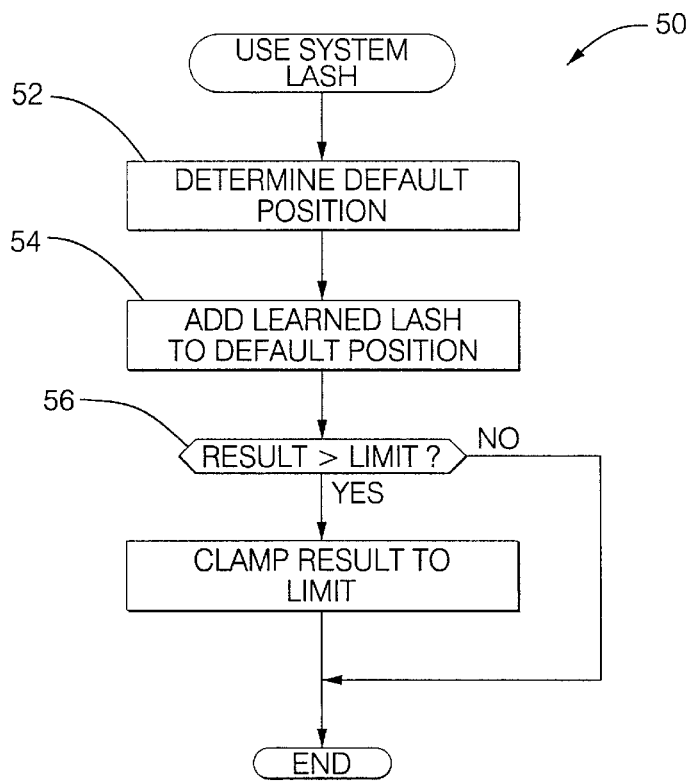
FIG. 4 is a flowchart illustrating portions of the command sequence of a control algorithm employing the learn as system of the instant application.
FIG. 5 is a lock up table.

Referring to FIG. 4, a flowchart 50 illustrates the procedure for correcting the lash. This procedure is executed every time the learning procedure of flowchart 30 is executed. A first step 52 determines the default position corresponding to a vehicle speed, which is read from the lookup table stored in the system's memory.

A step 54 adds the learned lash value, which is calculated by the procedure illustrated in FIG. 3, to the default position in the lookup table.

A decision node 56 compares the updated default position stored in the lookup table with the new limit calculated in the learning procedure (step 44 in FIG. 3). If the default exceeds the limit, then the correction procedure 30 ends. If, however, the updated default is less than or equal to the new limit, then control flows to box 44 where the default value is updated to be equal to the new limit. Hence, no default value in the lookup table will ever exceed the new limit. If the value is equal to the lookup value no action will be taken. If the difference is negative, then the lash will be reduced in the same manner it was increased. The value of lash stored is never allowed to go negative thus assuring that the designed in absolute authority will never be reduced to less than the design parameters.

The lash learn process or algorithm of the instant application is composed of basically the following variables:
 1. A designed absolute value of how much movement of the cable is allowed. (ACL, Absolute Cable Limit)
 2. A maximum lash that can be learned.
 3. A maximum lash that can be changed for each adjustment.
 4. A filter variable that limits the maximum lash change per cycle to a portion of the calculated lash.

The algorithm is designed in such a way that for the particular vehicle it is known where the throttle needs to be located for a given speed. This is derived experimentally by driving a vehicle on level road, with no lash in the system with no wind and at a known temperature. The vehicle travels at various known speeds and the number of "motor steps" in the cruise control module (CCM) is recorded. These values are then entered into a table, which is stored in non-volatile memory in the cruise control module. From that point, each time the 'Set' button of the cruise control is pressed by the vehicle operator, the value from the table (or an interpolated value), the CCM pulls to that exact point of throttle. If on the next vehicle, lash is present in the system, then the point that the CCM pulls to is modified by the normal cruise algorithm to some greater value. At the regular intervals the lash learn portion of the algorithm is run. The actual value of the motor steps is compared to the value in the original table. The difference between the value from the table and the actual value is filtered by some desired value and the resultant is added to the variable that can be considered lash and to the overall authority. The 'lash' value is then added to the lock up table value and to the overall authority of the system up to the maximum value calibrated into the system (if required).

If the algorithms calculate that there is less than the maximum allowed lash then the system only learns to the required amount. When the vehicle is traveling up hills or an incline or under loads that require greater throttle the system may overlearn. For example, the system may be overcompensating due to road conditions or load conditions that require a greater throttle position. However, and when the vehicle is going down hill or when the vehicle load is reduced then the system will unlearn the lash.

In addition, and when the system is working at either zero throttle (coasting down a steep hill) or above a certain authority (for instance 65% authority) the system is locked out from learning. This ensures that extreme conditions do not adversely affect the system.

The system is considered dynamic such that it is continuously learning and unlearning the lash. Road conditions (grades) will affect the system. On an average, the lash learned will be correct for the specific vehicle.

During the initial calibrations of the vehicle three things are considered for the design. First the maximum throttle authority is determined for the vehicle and second the lock-up for the tables are determined. The third item is that the cables are designed to not have a cable adjuster but are designed to have a set amount of lash designed into the system. For example, and in an exemplary embodiment, 4 mm of lash is designed into the cable. Then 4 mm of lash is calibrated into the CCM. If tolerances on the vehicle are tight then the learned lash will be reduced. If tolerances are loose then the maximum amount of lash that the system will see is the difference between 4 mm and the actual amount of lash. In either case, the performance of the system will be acceptable. Of course, and as applications may require, the amount of lash designed into the system may vary.

The lash learn algorithm of the instant application allows for a cost reduction in the cruise system by the removal of the cable adjuster. The performance of the cruise system will also be improved since without lash in the system, the initial sets of the cruise will not lose speed caused by the cable lash. In particular, and if the vehicle is traveling up hill with the lash removed out of the system, the vehicle will have the capability of reaching the appropriate throttle position to allow for the required downshift points. Generally, downshift points are defined as throttle positions relative to the vehicles speed. For example, and if an automatic transmission is in a higher gear and the throttle position is at a higher point, a downshift point will be reached and the transmission will shift to a lower gear to accommodate the required acceleration. This is generally a situation encountered by a vehicle traveling up an incline.

The instant application removes the human element out of adjusting and or misadjusting of the cable. In addition, the system directly compensates for cable compliance, which cannot be adjusted out of the system. Since the cable sheathing has a larger inside diameter then the outside diameter of the cable, the algorithm will also adjust for the pulling of the cable against the inside curve of the cable sheathing.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for controlling the speed of a vehicle, said apparatus comprising:
    a) a cruise control module for manipulating a cable having one end secured to a throttle and the other secured to an actuating device for applying a force to said cable;
    b) a microcontroller employing a command sequence for providing commands to said actuating device, said microcontroller receives an input in the form of a vehicle velocity setting and in response to said setting said microcontroller instructs said actuating device to pull said cable a predetermined distance corresponding to a known throttle position, said known throttle position corresponding to a vehicle velocity setting value being determined to correspond to a vehicle velocity similar to said vehicle velocity setting and once said vehicle reaches said vehicle velocity setting said command sequence determines the current throttle position and determines if the current throttle position is greater than said known throttle position if so, said command sequence filters the difference between the current throttle position and said known throttle position into a plurality of increments and modifies said known throttle position by said increments.

2. An apparatus for controlling the speed of a vehicle, said apparatus comprising:
    a) a cruise control system for manipulating a cable having one end secured to a throttle and the other secured to a motor for applying a force to said cable;
    b) a motor controller for providing commands to said motor, said motor controller receives an input in the form of a vehicle velocity setting and in response to said setting said motor controller instructs said motor to pull said cable a predetermined distance corresponding to a predetermined throttle position, said predetermined distance being stored in a lookup table and said predetermined throttle position corresponds to a vehicle velocity similar to said vehicle velocity setting, if said vehicle does not obtain said vehicle velocity setting said control authorizes said motor to pull said cable further, once said vehicle reaches said vehicle velocity setting said controller determines the current throttle position and determines if the current throttle position is greater than said predetermined throttle position if so, said controller modifies said predetermined throttle position corresponding to said vehicle velocity setting by filtering the difference between the throttle position and said predetermined throttle position to provide a filtered output, said filtered output dividing the difference between the throttle position and said predetermined throttle position into a plurality of increments.

3. The apparatus as in claim 2, wherein said motor it is a stepper motor and the number of steps of said stepper motor correspond to various vehicle speeds and are stored in said lookup table.

4. The apparatus as in claim 3, wherein said plurality of increments is a plurality of motor steps.

5. The apparatus as in claim 3, wherein said filtered output is filtered by a devisor which produces the value of said difference between the throttle position and said predetermined throttle position in order to limit the change of said predetermined throttle position.

6. A method for automatically controlling a velocity of a vehicle, said method comprising:
    a) adjusting the position of a throttle in response to a vehicle velocity setting;
    b) comparing the throttle position of said vehicle velocity setting to a default throttle position corresponding to said vehicle velocity setting;
    c) determining the difference between the throttle position and default throttle position of said vehicle velocity setting;
    d) filtering the difference between the throttle position and default throttle position of said vehicle velocity setting into a plurality of increments; and
    e) modifying said default throttle position value by one of said plurality of increments wherein said modified default throttle position corresponds to said throttle position corresponding to said vehicle velocity setting.

7. An apparatus for controlling the speed of a vehicle, comprising:
    a) a cable having a first end and an second end;
    b) a motor, said motor secured to said first end and a vehicle throttle being securable said second end, said vehicle throttle being biased in a closed position such that pulling of said cable by said motor opens said throttle to increase a vehicle velocity and release of said cable by said motor closes said vehicle throttle to decrease said vehicle velocity;
    c) a lookup table, said lookup table storing motor pulling distances corresponding to vehicle velocities;
    d) means for generating a vehicle velocity setting; and
    e) a motor controller, said motor controller pulling said cable one of said motor pulling distances to implement said vehicle velocity that corresponds to said vehicle velocity setting, and said motor controller continuously comparing said vehicle velocity and said vehicle velocity setting such that if said vehicle velocity is less than said vehicle velocity setting, said motor controller pulls said cable an additional distance until said vehicle velocity setting is reached, at which point said motor controller updates said motor pulling distances in said lookup table by an amount equal to said additional distance.

8. The apparatus as in claim 7, wherein said motor is a stepper motor, said motor pulling distances are motor steps, and said additional distance is an additional number of motor steps.

9. The apparatus as in claim 8, wherein said motor controller filters said additional number of motor steps.

10. The apparatus as in claim 9, wherein said motor controller filters said additional number of motor steps by a devisor.

11. A method of correcting lash in a vehicle's cruise control module, comprising:
    determining a stepper motor default position corresponding to a vehicle speed from a lookup table stored in a memory of the cruise control module;
    adding a learned lash value to said stepper motor default position to generate an updated default position;
    storing said updated default position in said lookup table;
    comparing said updated default position with a new limit value;
    ending the method of correcting lash in the cruise control module if said updated default position exceeds said new limit value;
    updating said updated default position to be equal to said new limit value if said updated default position is less than said new limit value; and
    taking no action if said updated default position is equal to said new limit value.

12. The method of claim 11, wherein adding said learned lash value to said stepper motor default position to generate an updated default position comprises:

determining whether a vehicle acceleration or deceleration is scheduled;

determining whether the cruise control module is above a calibrated maximum allowable number of motor steps stored in said lookup table only if said vehicle acceleration or deceleration is not scheduled;

comparing an actual position to said default position to generate said learned lash value.

13. The method of claim 12, wherein determining whether said vehicle acceleration or deceleration is scheduled, comprises comparing a current cruise setting and a current vehicle speed, if said current cruise setting and said current vehicle speed are equal than no vehicle acceleration or deceleration is scheduled.

14. The method of claim 12, wherein said learned lash value is zero if said actual position is equal to said default position.

15. The method of claim 11, wherein said new limit value comprises a function of said learned lash value a calibrated absolute authority.

16. The method of claim 11, wherein updating said updated default position to be equal to said new limit value if said updated default position is less than said new limit value comprises reducing to a smaller value said comparison of said updated default position with said new limit value by a predetermined number.

* * * * *